US012620659B2

(12) United States Patent
Holzmeier

(10) Patent No.: US 12,620,659 B2
(45) Date of Patent: May 5, 2026

(54) MOBILE ENERGY STORE AND METHOD FOR OPERATING A MOBILE ENERGY STORE

(71) Applicant: Hilti Aktiengesellschaft, Schaan (LI)

(72) Inventor: Georg Holzmeier, Martkoffingen (DE)

(73) Assignee: Hilti Aktiengesellschaft, Schaan (LI)

( * ) Notice: Subject to any disclaimer, the term of this patent is extended or adjusted under 35 U.S.C. 154(b) by 444 days.

(21) Appl. No.: 18/028,323

(22) PCT Filed: Oct. 5, 2021

(86) PCT No.: PCT/EP2021/077424
§ 371 (c)(1),
(2) Date: Mar. 24, 2023

(87) PCT Pub. No.: WO2022/073993
PCT Pub. Date: Apr. 14, 2022

(65) Prior Publication Data
US 2023/0378579 A1 Nov. 23, 2023

(30) Foreign Application Priority Data

Oct. 9, 2020 (EP) ..................................... 20200974

(51) Int. Cl.
*H01M 50/204* (2021.01)
*H01M 10/42* (2006.01)
(Continued)

(52) U.S. Cl.
CPC ....... *H01M 50/204* (2021.01); *H01M 10/425* (2013.01); *H01M 10/441* (2013.01);
(Continued)

(58) Field of Classification Search
CPC .. H01M 50/20; H01M 50/202; H01M 50/204; B62B 3/002; B62B 3/005
See application file for complete search history.

(56) References Cited

U.S. PATENT DOCUMENTS

| | | | | |
|---|---|---|---|---|
| 4,161,682 A | * | 7/1979 | Corvette | ............... H02J 7/0042 |
| | | | | 320/105 |
| 4,667,141 A | * | 5/1987 | Steele | .................... H02J 7/0042 |
| | | | | 320/DIG. 15 |

(Continued)

FOREIGN PATENT DOCUMENTS

| | | | |
|---|---|---|---|
| DE | 102018102982 A1 | 8/2019 | |
| EP | 2451001 A1 | 5/2012 | |

(Continued)

OTHER PUBLICATIONS

International Search Report of PCT/EP2021/077424 dated Jan. 18, 2022.

*Primary Examiner* — Jeffrey J Restifo
(74) *Attorney, Agent, or Firm* — Davidson Kappel LLC

(57) ABSTRACT

A mobile energy store for outputting electrical energy. The mobile energy store has, in particular, a storage unit which may have a modular structure and may comprise storage modules, wherein the mobile energy store also has a number of rechargeable battery interfaces for outputting the electrical energy to rechargeable batteries and/or electrical devices comprising rechargeable batteries. A method for operating a mobile energy store, wherein the storage unit of the mobile energy store can be charged with electrical energy and the electrical energy is output from the storage unit to rechargeable batteries and/or electrical devices including rechargeable batteries with at least one rechargeable battery interface.

20 Claims, 1 Drawing Sheet

(51) Int. Cl.
    *H01M 10/44*       (2006.01)
    *H01M 50/249*     (2021.01)

(52) U.S. Cl.
    CPC .. *H01M 50/249* (2021.01); *H01M 2010/4278*
               (2013.01); *H01M 2220/20* (2013.01)

(56)             References Cited

U.S. PATENT DOCUMENTS

| | | | | |
|---|---|---|---|---|
| 4,902,955 | A * | 2/1990 | Manis | H02J 7/0042 320/105 |
| 5,077,513 | A * | 12/1991 | Dea | B60R 16/0235 320/115 |
| 5,083,076 | A * | 1/1992 | Scott | H02J 7/0029 320/DIG. 15 |
| 5,111,127 | A * | 5/1992 | Johnson | H01M 50/296 320/101 |
| 7,622,890 | B2 * | 11/2009 | Krampitz | H01M 10/4285 324/426 |
| 8,162,330 | B2 * | 4/2012 | Melkumyan | B62B 3/003 280/47.35 |
| 8,210,548 | B1 * | 7/2012 | Agyemang | A61B 50/13 280/47.35 |
| 8,657,312 | B2 * | 2/2014 | Guasta | H02J 7/00 280/37 |
| 9,705,359 | B2 * | 7/2017 | Boyd | H01M 10/0525 |
| 9,797,306 | B1 * | 10/2017 | Stapleton | F02N 11/12 |
| 10,044,197 | B2 * | 8/2018 | Fry | H02J 7/342 |
| 2006/0006621 | A1 * | 1/2006 | Santa Cruz | B62B 3/004 280/79.3 |
| 2010/0327665 | A1 * | 12/2010 | Vidana | H01M 50/251 307/150 |
| 2011/0101780 | A1 * | 5/2011 | Johnson | H01M 50/247 307/66 |
| 2011/0101794 | A1 * | 5/2011 | Schroeder | H01M 50/209 320/101 |
| 2012/0112689 | A1 | 5/2012 | Sever et al. | |
| 2013/0307237 | A1 * | 11/2013 | Chen | A61G 12/001 280/35 |
| 2022/0359943 | A1 * | 11/2022 | Krutikova | H01M 50/256 |
| 2023/0182796 | A1 * | 6/2023 | Armbruster | A47L 13/51 280/47.35 |
| 2023/0329946 | A1 * | 10/2023 | Collins | B62B 3/003 |
| 2023/0378579 | A1 * | 11/2023 | Holzmeier | H02J 7/0024 |
| 2024/0150094 | A1 * | 5/2024 | Panosian | B62B 1/26 |
| 2024/0227602 | A1 * | 7/2024 | Pasko | B60L 53/60 |
| 2024/0347841 | A1 * | 10/2024 | Pasko | H01M 10/465 |

FOREIGN PATENT DOCUMENTS

| | | | |
|---|---|---|---|
| EP | 3379594 | A1 | 9/2018 |
| IT | V A20130023 | A1 | 11/2014 |
| WO | WO 9839831 | A1 | 9/1998 |

* cited by examiner

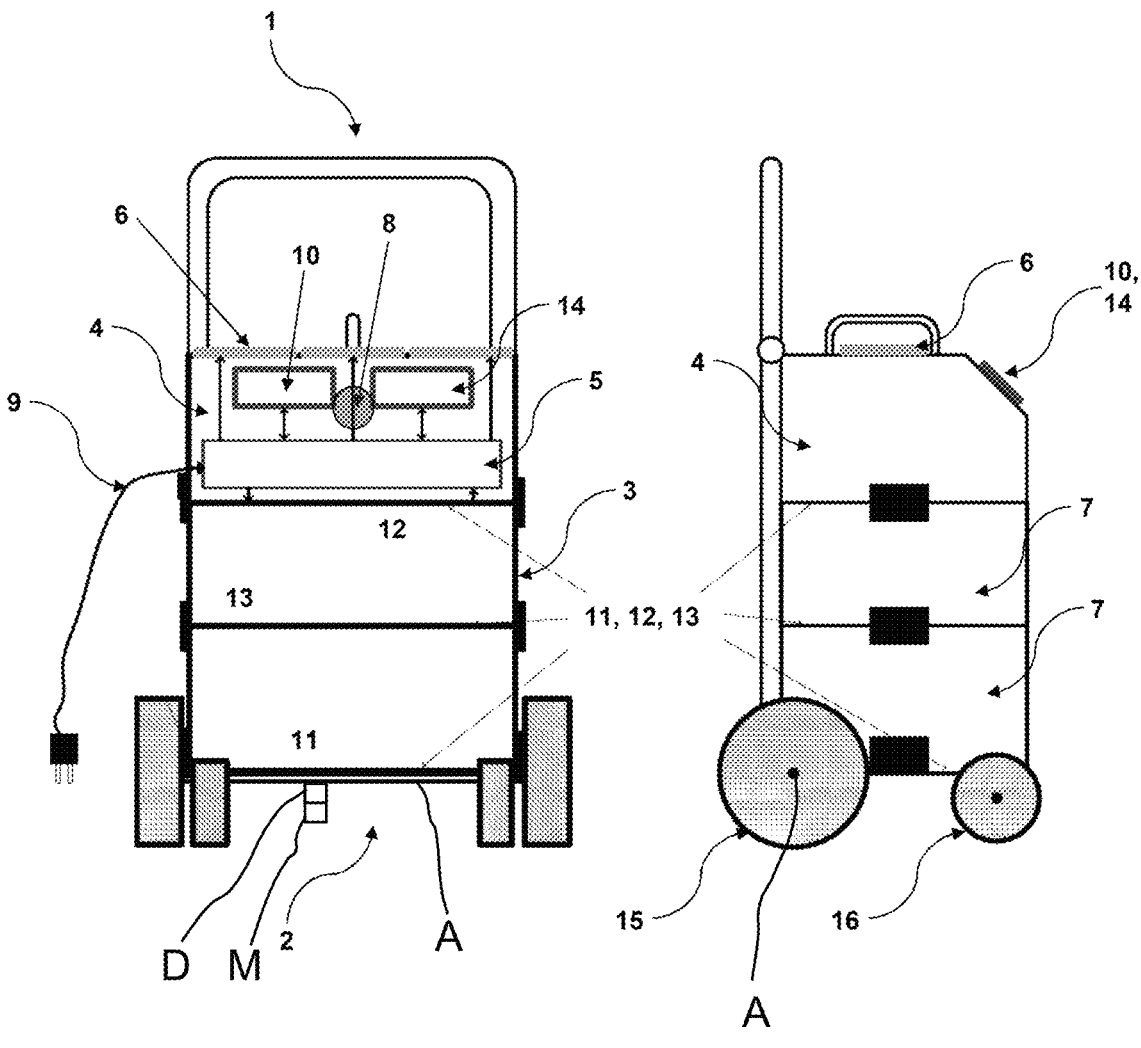

MOBILE ENERGY STORE AND METHOD FOR OPERATING A MOBILE ENERGY STORE

The present invention relates to a mobile energy store for outputting electrical energy. The mobile energy store has, in particular, a storage unit which may have a modular structure and may comprise storage modules, wherein the mobile energy store also has a number of rechargeable battery interfaces for outputting the electrical energy to rechargeable batteries and/or electrical devices comprising rechargeable batteries. In a second aspect, the invention relates to a method for operating a mobile energy store, wherein the storage unit of the mobile energy store can be charged with electrical energy and the electrical energy is output from the storage unit to rechargeable batteries and/or electrical devices comprising rechargeable batteries by means of at least one rechargeable battery interface.

BACKGROUND

In the field of hand-operated power tools, such as angle or cut-off grinders, drills, drill drivers, hammer drills, slot cutters, dispensers, bolt-firing tools etc., devices which no longer obtain their electrical energy via a mains connection but rather can be operated without a cable connection with a rechargeable battery as an energy supply unit are being increasingly brought onto the market. These so-called "rechargeable battery devices" have the advantage that there is no need for an electrical supply line at the place of work. This is advantageous, in particular, when the rechargeable-battery-operated power tools are not intended to be operated in the domestic environment, for example, but rather on a construction site which is not fully equipped with a power supply. This is because the rechargeable battery devices can be equipped with rechargeable batteries which make it possible to operate the power tool for a certain time even without an existing power supply. The provision of a power supply may be associated with a considerable amount of effort, in particular on large construction sites which have not been opened for very long, or in the case of other work outdoors.

SUMMARY OF THE INVENTION

However, the disadvantage of the known rechargeable battery devices is that, in the case of series applications or heavy work in particular, the on-board rechargeable batteries are quickly exhausted. Therefore, it may be desirable, for example on a construction site, despite the use of rechargeable battery devices, to have a replenishment of electrical energy in order to charge a second rechargeable battery pack—for example while working with a first rechargeable battery pack—in order to be able to work continuously.

It is an object of the present invention to overcome the above-described defects and disadvantages of the prior art and to provide a mobile energy store which can be used to ensure a stable and needs-oriented supply with electrical energy at locations which do not have a normal power supply or a connection to the public mains. This may be a construction site, for example. The energy store is intended to be able to be transported robustly and easily, with the result that it can also be moved along in a simple and uncomplicated manner on rough terrain.

The invention provides a mobile energy store for outputting electrical energy. The mobile energy store is characterized in that it comprises a chassis for transporting the mobile energy store, wherein the chassis is connected to a storage unit, wherein the storage unit is connected to a control head, wherein the control head comprises electronics for controlling the output of the electrical energy, wherein the mobile energy store has a number of rechargeable battery interfaces for outputting the electrical energy to rechargeable batteries and/or electrical devices comprising rechargeable batteries.

The invention therefore relates to a portable battery store, which is simple to transport on account of its chassis, for supplying rechargeable-battery-operated electric power tools, for example on a construction site or outdoors at a relatively great distance from a developed power supply or the mains. Large battery stores can often quickly become very heavy. The present invention provides the robust chassis which is suitable for construction sites. The energy store can be easily transported to the construction site and transported away again by means of this chassis. The chassis may comprise, for example, two larger wheels with an axle and two smaller castors on the opposite side of the energy store. In other words, in the context of the invention, it may be preferred for the chassis of the mobile energy store to comprise two wheels which can be connected to an axle. Furthermore, the chassis may comprise two castors, wherein the castors preferably have a smaller diameter than the wheels or rollers and are at a shorter distance from one another than the wheels of the chassis. In addition, the chassis may have a push bar in order to make it possible to ergonomically push and pull the mobile energy store. In order to achieve a required push height for the push bar, the push bar can be folded or pulled out, for example. For transport over stairs or for lifting out of a luggage compartment or a van, an additional handle may preferably be provided on the energy store.

A further advantage of the invention is that the use of mobile stores of electrical energy can replace the use of environmentally harmful, heavy and loud gasoline-operated or diesel-operated power generators. As a result, the environment can be protected and the output of $CO_2$ or noise emissions can be considerably reduced.

In one preferred configuration of the mobile energy store, the chassis of the mobile energy store comprises a drive with a motor, wherein the motor obtains its drive energy from the storage unit of the mobile energy store. In the context of the invention, this preferably means that the energy store does not have to be pulled or pushed over the construction site by a user or operator, but rather the user is assisted in this case by an electrical drive of the mobile energy store. In the context of the invention, it is preferred for the energy store or its preferably electrical drive unit to be able to be operated via the control panel on the control head of the energy store. A user interface or an input apparatus can be provided there, for example, and can be used to input speeds, directions or the like. Tests have shown that an electrical drive can substantially facilitate the use of the energy store and, in particular, its transport on a construction site.

In addition, the mobile energy store may have a modular structure. In the context of the invention, this preferably means that the storage unit of the energy store may comprise one or more storage modules. The storage unit can therefore be assembled in line with requirements, that is to say on the basis of an expected energy consumption or requirement. If, for example, a high energy consumption is expected on a working day on the construction site, the mobile energy store may comprise 2, 3, 4 or 5 storage modules, without being restricted thereto. In the case of a low expected energy requirement on a working day on the construction site, the storage unit or the energy store may comprise only one energy storage module, for example.

In the context of the invention, it is preferred for the storage modules to be integrated in the mobile energy store in a charged state.

In this case, it is preferred for the storage modules to be charged completely or substantially completely with electrical energy. In the context of the invention, it is preferred, in particular, for the storage modules to be able to receive a predefined amount of electrical energy and to be able to output it again later. In the context of the invention, the storage modules can therefore also be referred to as "standard storage modules". The mobile energy store is therefore preferably not only configured to output electrical energy, but rather the mobile energy store is also configured, in particular, to receive and store electrical energy. As a result of the fact that the electrical energy can be received and output at different locations, the mobile energy store is optimally suitable for mobile work.

In the exemplary embodiment of the invention illustrated in FIG. 1, the individual storage modules extend over the entire area of the energy store. In the context of the invention, however, it may also be preferred for 2, 3 or 4 individual storage modules, for example, to cover the area of the energy store or of a storage module completely filling this area. In other words, each storage module can be formed by further smaller storage modules. Whereas a horizontal arrangement of the storage modules is shown in the exemplary embodiment of the invention illustrated in FIG. 1, it may also be preferred in the context of the invention for the storage modules to be arranged vertically inside the mobile energy store. A mixture of horizontally and vertically arranged storage modules is also conceivable.

The mobile energy store comprises a storage unit and a control head which together form a unit. This unit may be connected to the chassis, with the result that the chassis, storage unit and control head together form the energy store. In the context of the invention, it is preferred for the control head to be arranged on a top side of the storage unit. In this case, the term "top side", in the context of the invention, does not constitute an unclear term for a person skilled in the art because a person skilled in the art recognizes that the chassis of the energy store is preferably arranged on the underside of the storage unit, wherein this underside faces the ground or the substrate, whereas the top side of the storage unit constitutes that side of the storage unit which is opposite the underside. The spatial direction "upward" preferably corresponds to a movement in the direction of the push bar of the energy store (also see: FIG. 1), for example, whereas the spatial direction "downward" corresponds to a movement in the direction of the substrate.

In the context of the invention, it is preferred for the chassis of the mobile energy store to be connected to the storage unit via a first interface. If the storage unit is composed of a plurality of storage modules, the lowermost storage module is preferably connected to the chassis via the first interface. In the context of the invention, it is preferred for the storage unit of the mobile energy store to be connected to the control head via a second interface. If the storage unit is composed of a plurality of storage modules, the uppermost storage module is preferably connected to the control head via the second interface. In the context of the invention, it is preferred for a plurality of storage modules to be able to be arranged between a lowermost storage module and the control head, for example 1, 2, 3, 4 or 5 further storage modules, without being restricted thereto. In the context of the invention, it is preferred for the storage modules to be connected to one another by way of a third interface in each case.

The interfaces may be, in particular, electrical and/or mechanical interfaces. This means that the interfaces may be configured, on the one hand, to establish a mechanical connection between the items which they connect. In this case, the first interface may preferably be configured to establish a connection between the chassis and the storage unit or a lower storage module, whereas the second interface is preferably configured to establish a connection between the storage unit and the control head, whereas the third interface is preferably configured to establish a connection between the storage modules if the storage unit is modularly composed of a plurality of storage modules. The mechanical portion of the interfaces preferably ensures stable and robust cohesion between the components of the energy store which are to be connected. The mechanical portion of the interfaces may comprise, for example, a tongue-and-groove connection, wherein the cohesion of the components of the energy store which are to be connected can be additionally reinforced by brackets which are preferably fitted on both sides on the side walls of the energy store. The interfaces or their mechanical portions advantageously ensure a defined mechanical connection between the components of the energy store which has proved to be surprisingly robust even under construction site conditions.

In the context of the invention, it is preferred for the electrical portion of the interfaces to enable an electrically conductive connection between the component parts of the energy store. Power or electrical energy can therefore be exchanged, for example, between the chassis and the storage unit (first interface), the control head and the storage unit (second interface) or between the storage modules of the storage unit (third interface). The interfaces may also be such that data can be exchanged via said interfaces. In this manner, information, control commands or other data, for example, can be exchanged between the components of the energy store.

For the modular structure of the energy store, it is advantageous to define suitable electrical interfaces which are configured to connect the stacked storage modules, for example, to one another and to connect them to the chassis, on the one hand, and to the control head, on the other hand, at the upper and lower edges. In this case, these first, second and third interfaces may expediently be similar or identical. However, it may also be preferred for the interfaces not to be identical and, as a result, to be able to have different functionalities. In addition, the interfaces make a contribution to the defined mechanical connection between the storage modules, the chassis and the control head, as a result of which the individual parts of the modular energy storage system are reliably held together. The mechanical connection may be effected, for example, using a tongue-and-groove connection which additionally also holds two individual parts to be connected together by means of a bracket on both sides. Above the storage modules, the control head may be connected to the storage modules via the same or a differing mechanical and/or electrical interface. This is preferably the second interface in the context of the invention.

On the one hand, the control head preferably accommodates an electrical controller which is preferably also referred to as "electronics" in the context of the invention. The electronics are configured, on the one hand, to control or enable the charging of the storage unit or the storage modules from the public mains or a conventional power connection. For this purpose, a connection line may be arranged on the energy store and comprises, for example, a mains cable with a plug-in connection ("plug"). On the other hand, the electronics are configured to control or enable charging of the rechargeable batteries or of the electrical devices which comprise rechargeable batteries. In order to charge the rechargeable batteries or the electrical devices which comprise rechargeable batteries, a sufficiently large number of charging stations for the rechargeable batteries is provided on the top side of the control head. In the context of the invention, these charging stations are preferably also referred to as rechargeable battery interfaces. They are preferably cavities or secluded regions in the control head of the energy store in which rechargeable batteries or parts of electrical devices can be inserted or accommodated. The charging stations preferably comprise electrical connection contacts which interact with corresponding connections on the rechargeable batteries or electrical devices to be charged in order to establish an electrically conductive connection between the control head of the energy store and the rechargeable batteries or electrical devices and to make it possible to charge the rechargeable batteries or electrical devices. The charging process can be automatically started and controlled by the electronics which are preferably arranged in the control head of the energy store. However, it may likewise be preferred for the charging operation to be started and/or controlled manually by an operator of the energy store. For this purpose, the user may use the control panel on the control head of the energy store, for example. Current information, data or operating parameters of the energy store or of its components and of the individual storage modules may be displayed to the user on a display device which may be arranged on the control head of the energy store, expediently beside or in the spatial vicinity of the control panel. In the context of the invention, it may also be preferred for information, data or operating parameters of the rechargeable batteries or electrical devices to be charged to be displayed on the control panel. For this purpose, a data and/or communication connection can be formed during the charging operation between the rechargeable batteries and/ or the electrical devices, on the one hand, and the control head, the electronics integrated therein or the energy store, on the other hand. This data and/or communication connection may be wired or wireless. In the context of the invention, it is preferred, in particular, for the electronics of the control head for controlling the output of the electrical energy to be connected to the rechargeable battery interfaces via a communication connection, wherein the communication connection is wired or wireless.

In the context of the invention, it is preferred for the mobile energy store to comprise at least one connection for a mains plug of an electrical device. In this respect, the mobile energy store may form a socket for an electrical device and may also be used to supply power to conventional electrical devices having a mains connection. For example, a vacuum cleaner, a water management system or a power tool may be connected to the mobile energy store in order to be supplied with electrical energy via the connection for the electrical device.

In the context of the invention, it is preferred for the storage modules to have a capacity of 1 to 2 kilowatt hours (kWh). If the mobile energy store comprises a connection for a mains plug of an electrical device, it may be preferred for its power output to be in the range of 3600 watts (W) and 16 amps (A) since, as a result, the energy can be supplied to the electrical device in a similar manner to a connection to the European standard mains.

In the context of the invention, it is preferred for the charging stations of the energy store to have an express charging function which makes it possible to charge the rechargeable batteries or the electrical devices in a particularly fast manner. On the one hand, such a fast charging function is associated with the temporal advantage that the rechargeable batteries are charged in a particularly fast manner. On the other hand, the preferably direct charging of the device rechargeable batteries via the mobile energy store is associated with the advantage that there is no need for any unnecessary conversion of AC voltage to DC voltage. This makes it possible to achieve a surprisingly high degree of efficiency since only low energy losses occur when charging the rechargeable batteries. In the context of the invention, it is preferred for the storage modules to have a similar, an identical or a substantially identical voltage to the rechargeable batteries which are charged by the energy store by means of the charging stations.

In the context of the invention, it is preferred for the mobile energy store, for the purpose of receiving electrical energy, to comprise a mains cable for connecting the mobile energy store to an energy network. The input of the mains cable may be arranged, for example, in the region of the control head of the mobile energy store. It is also possible to provide a direct, conductive connection to the electronics of the mobile store. Such a connection is illustrated in FIG. 1, for example. However, the mains cable may also enter the mobile energy store at all other locations. For example, the mains cable may be directly connected to the storage unit or a storage module. When charging the energy store, the electrical energy can directly enter the storage unit or one of the storage modules in this manner. In the case of a modularly assembled storage unit, it may be preferred for the electrical energy to then be uniformly distributed among the available storage modules. This preferably uniform distribution of the electrical energy can preferably be controlled by the electronics in the control head of the energy store. Corresponding information, data and control commands can be advantageously exchanged via the interfaces or the corresponding data and communication connections.

In the context of the invention, it is preferred for the mobile energy store, for the purpose of receiving electrical energy, to comprise means which make it possible to inductively charge the storage unit of the mobile energy store. In other words, in one preferred configuration of the invention, the mobile energy store can also be charged without the use of a mains cable. For this purpose, the energy store may comprise coils, for example, which make it possible to inductively charge the storage unit or the storage modules.

In the context of the invention, it is preferred for the control head of the mobile energy store to comprise a control panel, wherein the control panel is connected to the electronics of the control head via a communication or data connection. The communication connection may preferably be wired or wireless. In addition, in the context of the invention, it is preferred for the control head of the mobile energy store to comprise a display device, wherein the display device can likewise be connected to the electronics of the control head via a wired or wireless communication or data connection.

In a second aspect, the invention relates to a method for the operation of or for operating a mobile energy store. The terms, definitions and technical advantages introduced for the mobile energy store preferably apply in an analogous manner to the operating method for the energy store. The operating method is characterized by the following method steps:

a) providing the mobile energy store, b) charging the storage unit of the mobile energy store, c) outputting electrical energy from the storage unit of the mobile energy store to rechargeable batteries and/or electrical devices comprising rechargeable batteries by means of at least one rechargeable battery interface.

The mobile energy store provided may be a mobile energy store as described in the context of this invention. However, it may also be another mobile energy store. During charging, the storage unit of the mobile energy store may be charged with electrical energy. However, in the context of the invention, it may also be preferred for the storage modules of the storage unit of the mobile energy store to be charged with electrical energy. Charging is effected, for example, by virtue of the fact that a mains cable, which may be a constituent part of the mobile energy store, is connected to a socket or the mains. In the context of the invention, however, it may also be preferred for the mobile energy store to be charged with electrical energy using methods of inductive or resonant charging. The storage modules or the storage unit may be charged, for example, at night, that is to say between two working days, in particular. In this case, the user charges the mobile energy store over night at his workshop, for example, and takes it with him the next day in the charged state to the construction site again. There, empty rechargeable batteries of electrical devices or the electrical devices themselves can be charged from the mobile energy store. In terms of the storage capacity, the energy store is preferably designed in such a manner that the user can cover his daily electrical energy requirement with the energy stored in the energy store. The amount of electrical energy to be output or stored may preferably be set via a number of storage modules in the storage unit of the mobile energy store. In other words: the more storage modules are carried by the user of the mobile energy store on the construction site, the more electrical energy is available to the user on the construction site for charging empty rechargeable batteries.

In the context of the operating method, the electrical energy is output from the storage unit of the mobile energy store by means of rechargeable battery interfaces which are also referred to as charging stations in the context of the invention. In the context of the invention, it is preferred for at least one rechargeable battery interface to be arranged in the control head of the mobile energy store, which rechargeable battery interface is configured to receive a rechargeable battery and to charge it with electrical energy. The mobile energy store may also comprise, for example, 2, 3, 4, 5 or 6 charging stations, without being restricted thereto. The rechargeable battery interfaces may preferably also be arranged at a location other than the control head. When outputting the electrical energy from the storage unit to rechargeable batteries or electrical devices comprising rechargeable batteries, it is also possible to use methods of inductive or resonant charging.

If the mobile energy store comprises a connection for a mains plug of an electrical device, the mobile energy store may be used to operate conventional, mains-operated power tools, in particular to supply them with power. In this case, the electrical energy can also be output via a connection for a mains plug of an electrical device.

In one exemplary embodiment, the mobile energy store can comprises a unit comprising a control head and a storage unit that is fastened to a chassis. The energy store and its storage unit may preferably have a modular design. In this case, the storage unit may be composed of a plurality of standard storage modules or a storage module with a defined electrical storage capacity, wherein the storage modules can be stacked above the chassis of the energy store. The user of the mobile energy store can therefore decide how much energy or how many storage modules he requires for his daily work. According to this specification, the user can accordingly stack a large number of storage modules above one another in the mobile energy store and can take them to the construction site. This has the advantage that the energy store can be adapted to the different requirements of the users and that the user has to purchase or carry only as many storage modules as he actually requires for his applications.

With respect to the control head of the energy store, it is conceivable to integrate a display device which may be in the form of a display, a screen or a monitor, for example, without being restricted thereto. The display device can display the state of charge of the energy store to the user, for example. Further operating parts may also be arranged on the control head, for example an on/off switch for the energy store.

The supply of conventional mains-operated electrical devices or power tools is conceivable as a further function of the battery store. For this purpose, a socket can be fitted to the control head of the energy store and an inverter can be implemented in the control electronics. Inversion is preferably configured to transform a DC voltage in the energy store to an AC voltage of 110 V or 230 V, for example. Therefore, not only rechargeable battery devices having the portable energy store, but also conventional mains devices, could be supplied with electrical energy by the mobile energy store.

The main advantages of the invention are that the user of the energy store on a construction site is not dependent on an existing electrical energy supply. As a result, the user also need not make any effort to connect a voltage supply to the respective place of work. Furthermore, the use of environmentally harmful gasoline-operated and/or diesel-operated power generators is avoided. In particular, it is possible to entirely dispense with an existing power supply on the construction site since the user can directly bring his daily energy requirement from home to the construction site. In addition, the user requires fewer individual rechargeable battery packs or individual rechargeable batteries since the user can alternately charge the rechargeable batteries brought with electrical energy on the construction site from the energy store again.

BRIEF DESCRIPTION OF THE DRAWINGS

Further advantages will become apparent from the following description of the figures. The FIGURE, the description and the claims contain numerous features in combination. A person skilled in the art will expediently also consider the features individually and combine them to form useful further combinations.

In the FIGURE, the same and similar components are numbered with the same reference signs. In the FIGURE:

FIG. 1 shows a view of a preferred configuration of the mobile energy store

DETAILED DESCRIPTION

FIG. 1 shows a preferred configuration of a mobile energy store 1. A front view of the mobile energy store 1 is illustrated in the left half of FIG. 1 and a side view of the mobile energy store 1 is illustrated in the right half of FIG. 1. The preferred exemplary embodiment of the energy store 1 illustrated in FIG. 1 comprises a chassis 2, a storage unit 3 and a control head 4. The storage unit 3 and the control head 4 form a unit which is mounted on the chassis 2 and can be transported in a particularly simple manner by means of the chassis 2. The mobile energy store 1 may also have a push bar (without a reference sign, upper region in FIG. 1) and a handle (without a reference sign) in the region of the control head 4. In the context of the invention, it is preferred for the handle to be arranged between the control panel 10 and the display device 14. The push bar can be used to push or pull the mobile energy store 1. The handle can be used to remove the mobile energy store 1 from a luggage compartment, for example, in a particularly simple manner.

The chassis 2 forms the lower termination of the mobile energy store 1, wherein the storage unit 3 and the chassis 2 are connected to one another via a first interface 11. The interfaces 11, 12, 13 ensure, in particular, the mechanical and/or electrical connection between the components of the energy store 1 which are intended to be connected to one another using the interfaces 11, 12, 13. The first interface 11 is preferably configured to establish an electrically conductive connection between the storage unit 3 and the chassis 2 of the mobile energy store 1. The first interface 11 also makes it possible to mechanically connect the storage unit 3 and the chassis 2. The storage unit 3, which comprises at least one storage module 7, is preferably located above the chassis 2. The storage unit 3 preferably constitutes a modular storage unit 3 which may be composed of a plurality of storage modules 7. Electrical energy can be stored in the storage modules 7. This energy can reach the storage modules 7 or the storage unit 3 by virtue of a charging operation of the mobile energy store 1. For the purpose of charging, the mobile energy store 1 can be connected to the mains via a mains cable 9. This may be carried out at night or between two work deployments of the mobile energy store 1, for example. In a configuration of the invention which is not depicted, the mobile energy store 1 may also comprise means for inductively or resonantly charging the storage modules 7 or the storage unit 3.

The storage modules 7 are connected to one another by way of third interfaces 13. These third interfaces 13 may also be mechanical and/or electrical, that is to say establish a mechanical and/or electrically conductive connection between the individual storage modules 7. The control head 4 of the mobile energy store 1 is arranged above the storage unit 3, in particular above the uppermost storage module 7. The connection between the control head 4 and the storage unit 3 is established by a second interface 12 which—like the other interfaces 11 and 13 as well—may be electrical and/or mechanical. Brackets may be additionally provided on the sides of the mobile energy store 1 and contribute to there being a robust mechanical connection between the chassis 2, the storage unit 3, the control head 4 and the individual storage modules 7. These fastening brackets are depicted as black rectangles in the side view in FIG. 1 (right half of the image).

The control head 4 comprises different functional units of the mobile energy store 1. For example, the control head 4 comprises electronics 5 which make it possible to control the mobile energy store 1. In particular, the electronics 5 are provided for the purpose of monitoring and controlling the charging of the mobile energy store 1 and the output of the energy initially stored in the energy store 1 to corresponding loads. The electronics 5 of the mobile energy store 1 can determine, for example, whether all storage modules 7 of the storage unit 3 are uniformly discharged, that is to say contribute to the same extent to the output of the electrical energy to the rechargeable batteries in the rechargeable battery interfaces 6 or whether the storage modules 7 are substantially completely emptied in succession, for example. The electronics 5 of the mobile energy store 1 can make this dependent on internal operating states of the energy store 1 or of its components or else on environmental influences such as humidity or temperature, for example. For example, the electronics 5 of the mobile energy store 1 may be configured to detect what type of rechargeable battery is intended to be charged in the charging station 6 of the energy store 1 and can adapt the energy output to this information. For these purposes, the energy store 1 may have appropriate sensors and evaluation means, wherein the evaluation means may also be present in the control head 4 or the electronics 5 of the energy store 1, for example. In the context of the invention, it may also be preferred for the user to input information relating to the rechargeable batteries to be charged via a control panel 10 in the control head 4 of the mobile energy store 1.

In order to output the energy, the mobile energy store 1 comprises rechargeable battery interfaces 6 which are also referred to as charging stations 6 in the context of the invention. The charging stations 6 are configured to receive rechargeable batteries of electrical devices or power tools and to charge them with electrical energy. In this case, the rechargeable batteries may still be installed in the electrical devices or power tools or may be separate from them. For example, a first rechargeable battery may be charged by means of the mobile energy store 1, whereas a second rechargeable battery is used to work with a power tool. As soon as the second rechargeable battery is empty, this second rechargeable battery can be charged by means of the mobile energy store 1 and the first rechargeable battery can be used to operate an electrical device. The mobile energy store 1 may comprise a plurality of charging stations 6, for example one to eight, two to six or three to five charging stations.

The control head 4 of the mobile energy store 1 may also comprise a control panel 10 and/or a display device 14. The mobile energy store 1 can be switched on or off by a user using the control panel 10. Furthermore, charging or energy output operations can be started, interrupted or ended. The control panel 10 may comprise a user interface, for example, or may be in the form of a touchscreen. In the context of the invention, it may also be preferred for the control panel 10 to comprise switches, knobs and/or buttons. The display device 14 may be in the form of a display, a screen or a monitor, for example. States of charge of the individual rechargeable batteries in the charging stations 6 or states of charge of the individual storage modules 7 of the storage unit 3 can be displayed on the display device 14.

Not only rechargeable batteries and electrical devices having at least one rechargeable battery can be charged with electrical energy using the mobile energy store 1. If, in one preferred configuration of the invention, the energy store 1 has a connection 8 for a mains plug of an electrical device, those electrical devices or power tools which are designed for mains operation can also be supplied with electrical energy using the energy store 1. Such electrical devices or power tools which are designed for mains operation are referred to as conventional electrical devices or power tools in the context of the invention. The plug of such electrical devices or power tools can be inserted into the connection 8 for a mains plug of an electrical device, with the result that the electrical device is supplied with power via this electrically conductive connection and can be operated in this manner. For example, vacuum cleaners, water management devices or other assistance devices can be supplied with electrical energy in this manner.

The chassis 2 of the mobile energy store 1 preferably comprises in each case two wheels 15 and two castors 16 which are respectively arranged in pairs on opposite sides of the energy store 1. For example, the castors 16 may be arranged on a front side of the energy store 1, whereas the wheels or rollers 15 are arranged on the rear side of the energy store 1. The wheels 15 can be connected to one another using an axle A, shown solely schematically. The push bar of the energy store 1 is preferably also situated on the rear side of the energy store 1. A handle may preferably be arranged on the top side of the control head 4 (see side view of the invention, right half of the image in FIG. 1).

In one preferred configuration of the invention, the chassis 2 of the energy store 1 may comprise a drive with a motor (shown solely schematically as D and M), wherein the motor obtains its drive energy from the storage unit 3 of the mobile energy store 1. In this manner, the user of the energy store 1 can receive considerable assistance when transporting the energy store 1, and the energy store 1 can advantageously also be used on particularly rough terrain.

LIST OF REFERENCE SIGNS

1 Mobile energy store
2 Chassis
3 Storage unit
4 Control head
5 Electronics
6 Rechargeable battery interfaces or charging stations
7 Storage modules
8 Connection for a mains plug of an electrical device
9 Mains cable for connecting the mobile energy store to an energy network
10 Control panel
11 First interface
12 Second interface
13 Third interface
14 Display device
15 Wheels
16 Castors

What is claimed is:

1. A mobile energy store for outputting electrical energy, the mobile energy store comprising:
    a chassis for transporting the mobile energy store;
    an energy storage unit connected to the chassis;
    a control head connected to the energy storage unit, the control head including electronics for controlling an output of electrical energy from the energy storage unit; and
    a plurality of rechargeable battery interfaces for outputting the electrical energy to rechargeable batteries or electrical devices including rechargeable batteries;
    the chassis being connected directly to the energy storage unit via a first interface, and the energy storage unit being connected directly to the control head via a second interface.

2. The mobile energy store as recited in claim 1 wherein the energy storage unit has a plurality of storage modules connected to one another by a storage module interface.

3. The mobile energy store as recited in claim 1 wherein the mobile energy store includes at least one connection for a mains plug of an electrical device.

4. The mobile energy store as recited in claim 1 wherein the mobile energy store, for the purpose of receiving electrical energy, includes a mains cable for connecting the mobile energy store to an energy network.

5. The mobile energy store as recited in claim 1 wherein the energy storage unit is inductively chargeable.

6. The mobile energy store as recited in claim 1 wherein the electronics communicate with the rechargeable battery interfaces in a wireless or wired fashion.

7. The mobile energy store as recited in claim 1 wherein the interfaces are electrical or mechanical interfaces.

8. The mobile energy store as recited in claim 1 wherein the control head includes a control panel connected to the electronics for communication in a wired or wireless fashion.

9. The mobile energy store as recited in claim 1 wherein the control head includes a display device connected to the electronics for communication in a wired or wireless fashion.

10. The mobile energy store as recited in claim 1 wherein the chassis includes a drive with a motor, wherein the motor obtains drive energy from the energy storage unit of the mobile energy store.

11. The mobile energy store as recited in claim 1 wherein the chassis includes wheels connected to an axle.

12. The mobile energy store as recited in claim 1 wherein the chassis includes castors.

13. A method for operating a mobile energy store as recited in claim 1, the method comprising the following steps:
    a) providing the mobile energy store;
    b) charging the energy storage unit of the mobile energy store; and
    c) outputting electrical energy from the energy storage unit of the mobile energy store to the rechargeable batteries or the electrical devices via the at least one rechargeable battery interface.

14. The method as recited in claim 13 wherein an amount of electrical energy to be output is settable via storage modules in the energy storage unit of the mobile energy store.

15. The method as recited in claim 13 wherein the electrical energy is also output via a connection for a mains plug of an electrical device.

16. The mobile energy store as recited in claim 1 wherein the first interface electrically and mechanically connects the energy storage unit and the chassis, the chassis further comprising wheels located below the energy storage unit.

17. The mobile energy store as recited in claim 1 wherein the energy storage unit constitutes a modular storage unit composed of a plurality of storage modules one above the other.

18. The mobile energy store as recited in claim 17 wherein the storage modules are connected to one another via third interfaces.

19. The mobile energy store as recited in claim 18 further comprising brackets connecting the storage modules in addition to the third interfaces.

20. The mobile energy store as recited in claim 17 wherein the control head is arranged above the energy storage unit.

* * * * *